United States Patent
Parry-Jones et al.

(10) Patent No.: US 8,547,623 B2
(45) Date of Patent: Oct. 1, 2013

(54) DUAL-MODE ELECTROWETTING DISPLAY DEVICE

(75) Inventors: Lesley Parry-Jones, Courtenay (GB); Alexandra Baum, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 176 days.

(21) Appl. No.: 13/302,062

(22) Filed: Nov. 22, 2011

(65) Prior Publication Data

US 2013/0128335 A1    May 23, 2013

(51) Int. Cl.
    *G02F 1/03*      (2006.01)
    *G02B 26/00*     (2006.01)
    *G02B 26/02*     (2006.01)

(52) U.S. Cl.
    USPC ........... 359/253; 359/228; 359/245; 359/290; 359/295; 345/87; 345/173

(58) Field of Classification Search
    USPC ............... 359/228, 238, 245, 253, 290–295, 359/298, 463; 345/32, 87–89, 102, 104, 345/156, 173–175, 207; 349/12, 15, 62, 349/86; 977/774, 952
    See application file for complete search history.

(56) References Cited

U.S. PATENT DOCUMENTS

| | | | |
|---|---|---|---|
| 6,762,873 B1 * | 7/2004 | Coker et al. .................. | 359/290 |
| 7,359,108 B2 | 4/2008 | Hayes et al. | |
| 7,812,809 B2 * | 10/2010 | Choi et al. ..................... | 345/102 |
| 8,014,054 B2 * | 9/2011 | Lo et al. ......................... | 359/253 |
| 8,139,039 B2 * | 3/2012 | Schneider et al. ............ | 345/173 |
| 8,228,301 B2 * | 7/2012 | Schneider ..................... | 345/173 |
| 8,472,101 B2 * | 6/2013 | Lo et al. ........................ | 359/228 |
| 2007/0127108 A1 | 6/2007 | Hayes et al. | |
| 2009/0046082 A1 | 2/2009 | Jacobson et al. | |

FOREIGN PATENT DOCUMENTS

| | | |
|---|---|---|
| JP | 2006-243169 A | 9/2005 |
| JP | 2006-215264 A | 8/2006 |
| WO | 02-103666 A2 | 12/2002 |
| WO | 2007/110582 A2 | 10/2007 |

* cited by examiner

*Primary Examiner* — Loha Ben
(74) *Attorney, Agent, or Firm* — Renner, Otto, Boisselle & Sklar, LLP

(57) ABSTRACT

An electrowetting display device that features dual-mode operation. The display device can operate in either a low-power consumption bistable mode, or a higher-power consumption fast switching (video-rate) mode.

17 Claims, 7 Drawing Sheets

(a)

(b)

(c)

DUAL-MODE ELECTROWETTING DISPLAY DEVICE

TECHNICAL FIELD

The invention relates to a display device and, more particularly, an electrowetting display device. Further, the invention relates to a display device which can operate in either a low-power consumption bistable mode, or a higher-power consumption video-rate mode.

BACKGROUND ART

Electronic paper has long been a goal of the displays industry, and with the advent of E-Ink technology, high quality paper-like monochrome displays have been available on E-book readers for a number of years. However, such displays, whilst providing very low power-consumption at low refresh rates, and excellent sunlight readability, are incapable of displaying high brightness colour or video rate moving images. The release of the iPad® tablet PC from Apple, with a standard transmissive liquid crystal display (LCD) screen (much like that available on a laptop computer, desk-top PC monitor or television) capable of displaying video rate colour images has thrown the concept of electronic paper for portable devices into confusion. Which is more important, efficiency and sunlight readability, or full-colour video-rate capable screens?

The answer to this question is of course to have a display which is capable of both functionalities, a so-called "dual-mode" display. In a first "low-power" mode, the display operates in a bistable configuration. This mode will be used when the display does not need to cope with video-rate content, i.e. low refresh rates, and as such will have low power-consumption due to its bistability. In a second "video-rate" mode, the display operates in a monostable configuration. This mode will be used when the display needs to cope with video-rate content, i.e. high refresh rates, and as such will have higher power consumption than in the "low-power" mode. The power-consumption in the "video-rate" mode may be comparable with today's standard LCD displays. However, such "single-mode" displays would consume the same power even if they were displaying infrequently updated images, and therefore a dual-mode display can offer significant overall power-saving opportunities.

It should be noted at this stage that the use of bistable and dual-mode displays is most relevant when applied to reflective displays, since the power-saving provided by the bistability is more or less irrelevant if the display is back-lit. The ultimate display for portable devices is therefore dual-mode with a high reflectivity in the bright state.

Dual-mode LCDs have previously been suggested but so far (to the best of the authors' knowledge) none have been manufactured. WO 2007/110582A2 (J. F. Stromer et at.; 16 Mar. 2007) describes a cholesteric liquid crystal mode which can be operated in either a bistable or a video-rate mode. WO 2002/103666 A2 (C. Jones; 27 Dec. 2002) describes a method for operating one of the two bistable states of a zenithally bistable liquid crystal display in an analogue fashion for video-rate operation.

However, such displays will always be limited in brightness due to the fact that LCDs generally require a polarizer, and so reflectivity has a theoretical upper limit of 50% (for monochrome displays) and 17% (for RGB colour displays). Of course these values are never quite reached because of the limits imposed by display aperture ratio, which is around 95% at best for LCDs. A more promising technology for reflective displays is that of electrowetting: since there is no polarizer required, the theoretical limit on reflectivity is 100%, aside of course from the aperture ratio, which is currently much lower for electrowetting but still offers a brightness improvement over LCD.

Both bistable and video-rate electrowetting display modes have been proto-typed and demonstrated. US 2007/0127108 A1 (R. Hayes et al.; 7 Jun. 2007) describes an electrowetting display mode that is capable of video-rate operation. U.S. Pat. No. 7,359,108 B2 (R. Hayes et al.; 15 Apr. 2008) and US2009/0046082 A1 (J. Jacobson et al., 19 Feb. 2009) describe electrowetting display modes which are capable of bistable operation. However, so far no dual-mode electrowetting modes have been suggested.

SUMMARY OF INVENTION

Electronic displays available today are either low-power bistable displays, or higher-power consumption displays capable of video rate. There is a need for a dual-mode reflective display mode that can operate in either a low-power bistable mode or a higher-power consumption video-rate mode according to the content being displayed. This display mode should preferably be reflective in order to maximize the utility of the power-saving achieved in the low-power mode. Liquid crystal displays are not currently reflective enough to provide a high quality colour reflective display mode.

This invention aims to solve this problem by using a dual-mode electrowetting display mode. In a first "low-power" mode, a fluid droplet is manipulated via pixel electrodes in a bistable mode, which need not be particularly fast. In a second "video-rate" mode, the fluid droplet is manipulated by the same pixel electrodes but in a different way, so that a faster (but higher power-consumption) response is achieved, suitable for displaying video-rate content. This dual-mode electrowetting display mode is reflective, and can be used to make either monochrome or colour displays, as required by the particular application.

According to an aspect of the invention, a dual-mode electrowetting display device is provided which includes a plurality of electrowetting pixels each configured to operate selectively in a bistable mode and a fast-switching analogue mode.

According to another aspect, the display device includes a transparent upper substrate representing a face of the display device, and a lower substrate; the electrowetting pixels each include a middle substrate which acts as a separator between two layers of electrowetting fluids one of which exists above the middle substrate and below the upper substrate and the other of which exists below the middle substrate and above the lower substrate, and at least one fluid channel which permits the electrowetting fluids to move between the layers; the middle substrate is configured to obscure the layer of electrowetting fluids which exists between the middle substrate and the lower substrate from an observer viewing the face of the display device; and the display device further including a driver circuit configured to control an appearance of each pixel in the bistable mode and the fast-switching analogue mode by controlling a position of the electrowetting fluids within the two layers.

In accordance with yet another aspect, the electrowetting fluids include a non-polar fluid which at least one of absorbs light and reflects light, and a transparent polar fluid.

In yet another aspect, in a first bistable state of the electrowetting pixels in the bistable mode the non-polar fluid covers the top of the middle substrate facing the upper substrate.

According to still another aspect, in a second bistable state of the electrowetting pixels in the bistable mode the non-polar fluid is positioned in the layer of electrowetting fluids between the middle substrate and the lower substrate so as to be obscured from the observer.

In accordance with another aspect, in the fast-switching analogue mode the driver circuit is configured to control a fraction of the top of the middle substrate facing the upper substrate that is covered by the non-polar fluid in the electrowetting pixels.

According to another aspect, the middle substrate insofar as facing the upper substrate is at least partially reflective, and the non-polar fluid absorbs light.

According to still another aspect, the middle substrate insofar as facing the upper substrate is light absorbing, and the non-polar fluid reflects light.

In accordance with still another aspect, the at least one fluid channel is located at an edge of the electrowetting pixel.

According to yet another aspect, the at least one fluid channel is located at or between an edge and center of the electrowetting pixel.

In accordance with still another aspect, the electrowetting pixels each include a plurality of fluid channels.

According to another aspect, the middle substrate in the electrowetting pixels has a tapered cross section to assist fluid motion and increase switching speed.

According to still another aspect, the top of the middle substrate facing the upper substrate and the bottom of the middle substrate facing the lower substrate each include a respective electrode for controlling the wettability of the polar fluid thereat.

In accordance with another aspect, the driver circuit is configured to drive the electrowetting pixels to a first bistable state in the bistable mode by providing a potential difference between the electrode at the bottom of the middle substrate and the polar fluid for at least a predetermined time and duration associated with the first bistable state while maintaining the electrode at the top of the middle substrate and the polar fluid at a same potential.

According to another aspect, the driver circuit is configured to drive the electrowetting pixels to a second bistable state in the bistable mode by providing a potential difference between the electrode at the top of the middle substrate and the polar fluid for at least a predetermined time and duration associated with the second bistable state while maintaining the electrode at the bottom of the middle substrate and the polar fluid at a same potential.

According to still another aspect, the driver circuit is configured to drive the electrowetting pixels in the fast-switching analogue mode by varying the potential difference between electrode at the top of the middle substrate and the polar fluid while remaining below the predefined threshold associated with the second bistable state, and while the potential difference between the electrode at the bottom of the middle substrate and the polar fluid remains above the predefined threshold associated with the first bistable state.

In still another aspect, the driver circuit in driving the electrowetting pixels in the fast-switching analogue mode is configured to blank the electrowetting pixels by first driving the electrowetting pixels into the first bistable state.

According to another aspect, the middle substrate includes hydrophobic layers on the top of the middle substrate facing the upper substrate and the bottom of the middle substrate facing the lower substrate.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Figure 1:
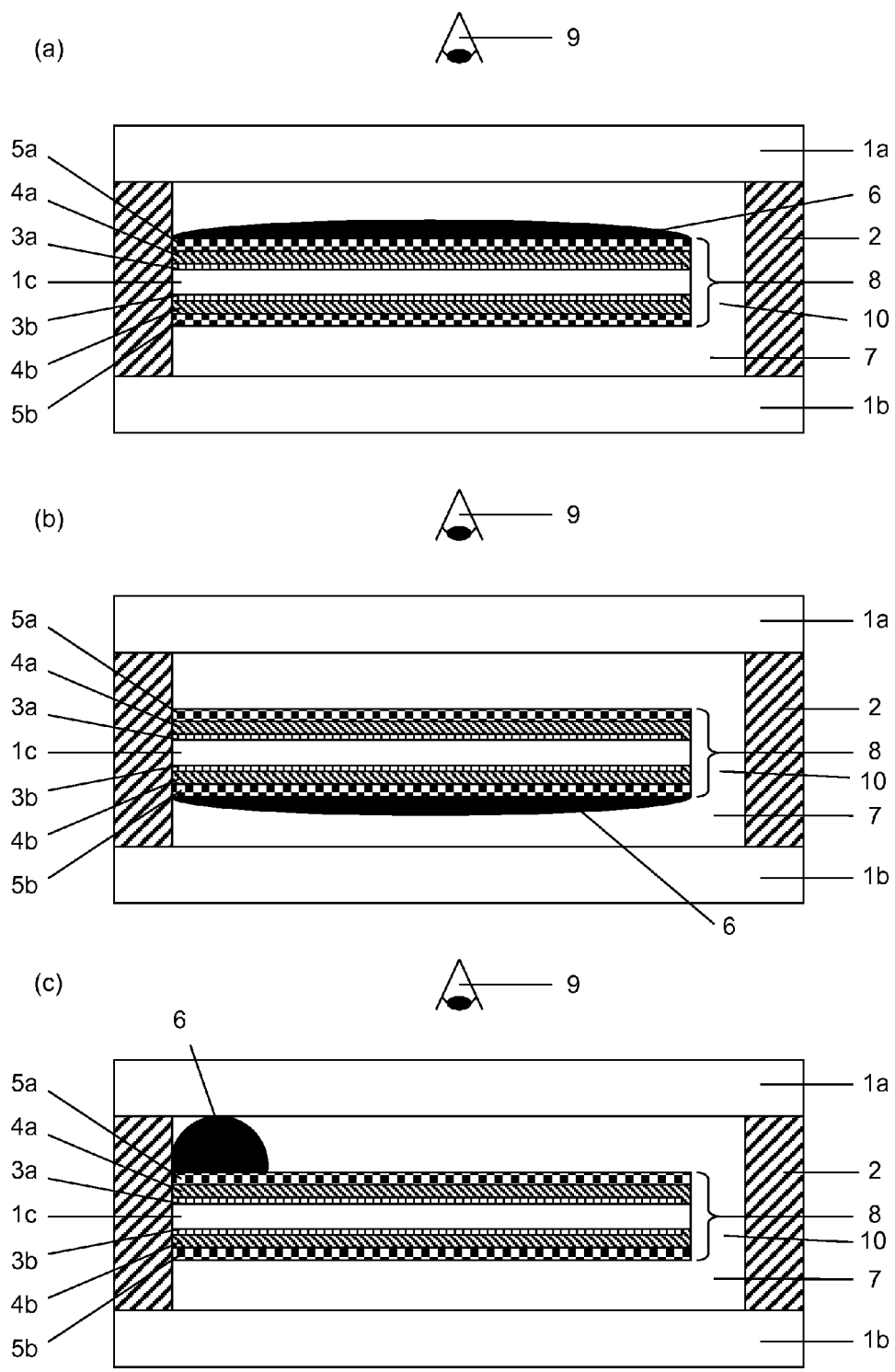
FIG. 1 Illustration showing typical electrowetting fluid distributions in the various modes of the present invention:
(a) a first bistable mode;
(b) a second bistable mode;and
(c) an example of fluid position in a video-rate mode.

DESCRIPTION OF REFERENCE NUMERALS 1a upper substrate
1b lower substrate
1c middle substrate
1d absorbing middle substrate
2 pixel wall
3 electrode
3a upper electrode
3b lower electrode
4 dielectric layer
4a upper dielectric layer
4b lower dielectric layer
5 hydrophobic layer
5a upper hydrophobic layer 5b lower hydrophobic layer
6 non-polar fluid
6a reflective non-polar fluid
7 polar fluid
8 multi-layer stack
9 observer
10 fluid channel(s)
20 pixel
22 column driver
24 data interface
26 row driver
28 mode selector

DETAILED DESCRIPTION OF INVENTION

FIG. 1 shows some side-views of an electrowetting pixel in a dual-mode electrowetting display, according to the present invention. The display has an upper substrate (1a) representing a face of the display, and a lower substrate (1b). Between the two substrates are pixel walls (2) which serve both as substrate separators, and as a way of supporting internal middle substrate (1c). This middle substrate (1c) is used as a means of separating two layers of electrowetting fluids, one of which exists above the middle substrate (1c) and below the upper substrate (1a), and the other of which exists below the middle substrate (1c) and above the lower substrate (1b). The middle substrate (1c) also includes on respective upper and lower surfaces two electrodes (3a) and (3b), two dielectric layers (4a) and (4b), and optionally two hydrophobic layers (5a) and (5b) for manipulating the position of the fluids via electrowetting, as illustrated in FIG. 1. There are two types of electrowetting fluids, a non-polar fluid (6) and a polar fluid (7).

The upper substrate (1a) is made out of any transparent material, for example, glass or plastic. The lower substrate (1b) is made out of any material, and does not need to be transparent. The middle substrate (1c) can be made out of any material, such as glass, plastic, photoresist or metal. The electrodes (3a) and (3b) can be made from any conducting material such as a metal, or a transparent conductor such as indium-tin-oxide (ITO). The dielectric layers (4) can be made from any insulating material such as silicon oxide, silicon nitride, aluminium oxide, hafnium oxide, barium strontium titanate or Parylene®. The optional hydrophobic layers (5) can be made of any material such as Teflon or Cytop. The middle substrate (1c), electrodes (3a) and (3b), dielectric layers (4) and optional hydrophobic layers (5) will collectively be referred to herein as a multi-layer stack (8), and also in the broadest sense simply as the middle substrate. The multi-layer stack (8) acts as a separator between the two layers of electrowetting fluids otherwise joined by a fluid channel (10), the first of which is between the multi-layer stack (8) and the upper substrate (1a), and the second of which is between the multi-layer stack (8) and the lower substrate (1b).

Although there is considerable freedom in the choice of materials for the individual elements of the multi-layer stack (8), in order to use the device as a reflective display, at least one of the individual elements of the multi-layer stack (8) must be at least partially reflective from the perspective of a observer (9) who is positioned above the upper substrate (1a). The higher the reflectivity of the multi-layer stack (8) as a whole, the higher is the reflectivity of the bright state of the display. There may be one or more layers within the multi-layer stack which are reflective. For example, the upper electrode (3a) could be made out of a reflective metal such as aluminium, silver or nickel. The surface of the metal layer could either be smooth or bumpy, to produce either a specular or diffuse reflection. Alternatively, the upper electrode (3a) could be made from a substantially transparent conductor such as ITO, and the middle substrate (1c) made from a reflective material such as metal or a reflective plastic. As a further alternative, the middle substrate (1c) could be coated with a reflective layer, for example, a resin containing titanium dioxide particles. As a still further alternative, the dielectric layer (4a) could be composed of many individual dielectric layers, which all together act as a dielectric mirror by a process of optical interference. As a still further alternative, the dielectric layer (4a) could be made from a scattering material. It is also possible to make many combinations of the various techniques above for making a multi-layer stack (8) which is reflective. For example, a scattering dielectric layer (4a) could be combined with a metallic upper electrode (3a). In all cases, no matter what the reflectivity of the multi-layer stack (8), it should be optically opaque, so that the layer of electrowetting fluids contained between the multi-layer stack (8) and the lower substrate (1b) is obscured from the observer (9) who is positioned above the upper substrate (1a) (i.e., who is viewing the face of the display).

The non-polar fluid (6) can be any non-polar liquid for example dodecane, and include a non-polar dye material in order to absorb light. The polar fluid 7 can be any transparent polar fluid for example water or ethyl alcohol, with or without a small concentration of ions (e.g. potassium chloride) to aid conductivity. The polar fluid (7) essentially acts as a third, movable electrode, most easily connected to electrical ground. Connection to the polar fluid (7) can be made either via a transparent electrode on the upper substrate (1a), though an electrode on the lower substrate (1b), or through electrodes on the pixel walls (2), none of which are illustrated in FIG. 1.

FIG. 1(a) shows the position of the fluids in the first bistable state of the system. The non-polar fluid (6) is positioned so that it covers the top of the middle substrate (1c) facing the upper substrate (1a), and the polar fluid (7) occupies the remaining volume of the pixel. Because the non-polar (6) fluid absorbs light, and the polar fluid (7) is transparent, the appearance of the pixel to an observer (9) above the upper substrate (1a) is dark or black. FIG. 1(b) shows the position of the fluids in the second bistable state of the system. The non-polar fluid (6) is positioned underneath the middle substrate, and the polar fluid (7) occupies the remaining volume of the pixel. Because the non-polar fluid (6) is obscured from view by the multi-layer stack (8), and because at least one of the layers of the multi-layer stack (8) between the electrowetting fluid layers is reflective, the appearance of the pixel to an observer (9) above the upper substrate (1a) is bright or white. FIG. 1(c) shows a typical position of the fluids during operation of the "video-rate" mode of the pixel. Starting from the bistable state shown in FIG. 1(a), the non-polar fluid (6) has been displaced sideways along the middle substrate (1c), so that it covers a smaller area of the middle substrate (1c), but occupies a greater fraction of the vertical height between the multi-layer stack (8) and the upper substrate (1a). Although in this mode the non-polar fluid (6) remains on the upper-side of the multi-layer stack (8), as it is displaced sideways, some fraction of the multi-layer stack (8) is revealed to the observer (9) above the upper substrate (1a). Because the non-polar fluid (6) absorbs light, the polar fluid (7) is transparent, and the multi-layer stack (8) reflects light, the appearance of the pixel to an observer (9) above the upper substrate (1 a) can be anything between dark (or black) and bright (or white), depending on the amount of sideways displacement of the non-polar fluid (6), i.e. the fraction for the reflective area that is exposed. Therefore, the reflectivity of the pixel can be tuned.

Figure 2:
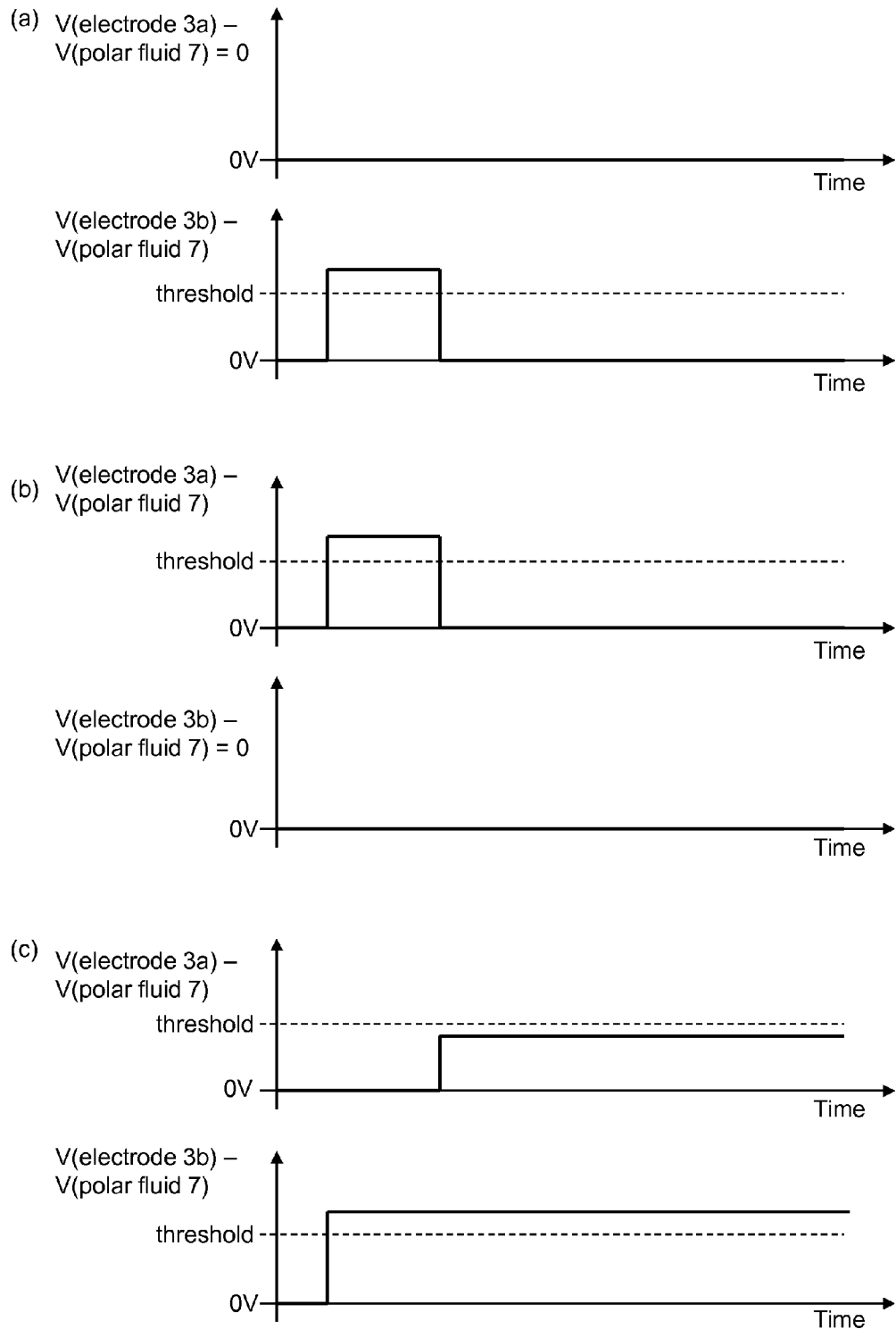
FIG. 2 Illustration showing typical driving voltages required to facilitate the various modes of the present invention:
(a) voltage pulse required on lower electrode in order to achieve the first bistable mode;
(b) voltage pulse required on upper electrode in order to achieve the second bistable mode;and
(c) bias voltage required on lower electrode, and example of driving voltage used on upper electrode in order to achieve maintain the non-polar fluid on the upper surface of the multi-layer stack during video-rate mode operation.

In order to position the fluids as in the first bistable state (FIG. 1(*a*)), upper electrode (3*a*) is connected to the electrical ground so that it is at the same potential as the polar fluid (7). A potential difference is then applied between lower electrode (3*b*) and ground. The wettability of the polar fluid (7) on the lower hydrophobic layer (5*b*) will be increased, and if the potential difference between the lower electrode (3*b*) and ground is above a predefined threshold value, and held for a predefined threshold duration associated with the first bistable state, the non-polar fluid (6) will move in order to accommodate this change, i.e. it will occupy the position above the multi-layer stack (8), as illustrated in FIG. 1(*a*). When the potential difference between the lower electrode (3*b*) and ground is removed, the non-polar fluid (6) will remain in the same position, i.e. this is a stable ground state of the system. A typical drive voltage sequence (essentially just a single voltage pulse of sufficient magnitude and duration) required to drive the device into the first bistable state is shown in FIG. 2(*a*).

In order to position the fluids as in the second bistable state (FIG. 1(*b*)), the lower electrode (3*b*) is connected to ground so that it is at the same potential as the polar fluid (7). A potential difference is then applied between the upper electrode (3*a*) and ground. The wettability of the polar fluid (7) on the upper hydrophobic layer (5*a*) on the upper-side of the multi-layer stack (8) will be increased, and if the potential difference between the lower electrode (3*b*) and ground is above a predefined threshold value, and held for a predefined threshold duration associated with the second bistable state, the non-polar (6) fluid will move in order to accommodate this change, i.e. it will occupy the position below the multi-layer stack (8), as illustrated in FIG. 1(*b*). When the potential difference between the lower electrode (3*b*) and ground is removed, the non-polar fluid 96) will remain in the same position, i.e. this is a stable ground state of the system. A typical drive voltage sequence (essentially just a single voltage pulse of sufficient magnitude and duration) required to drive the device into the second bistable state is shown in FIG. 2(*b*).

Figure 3:
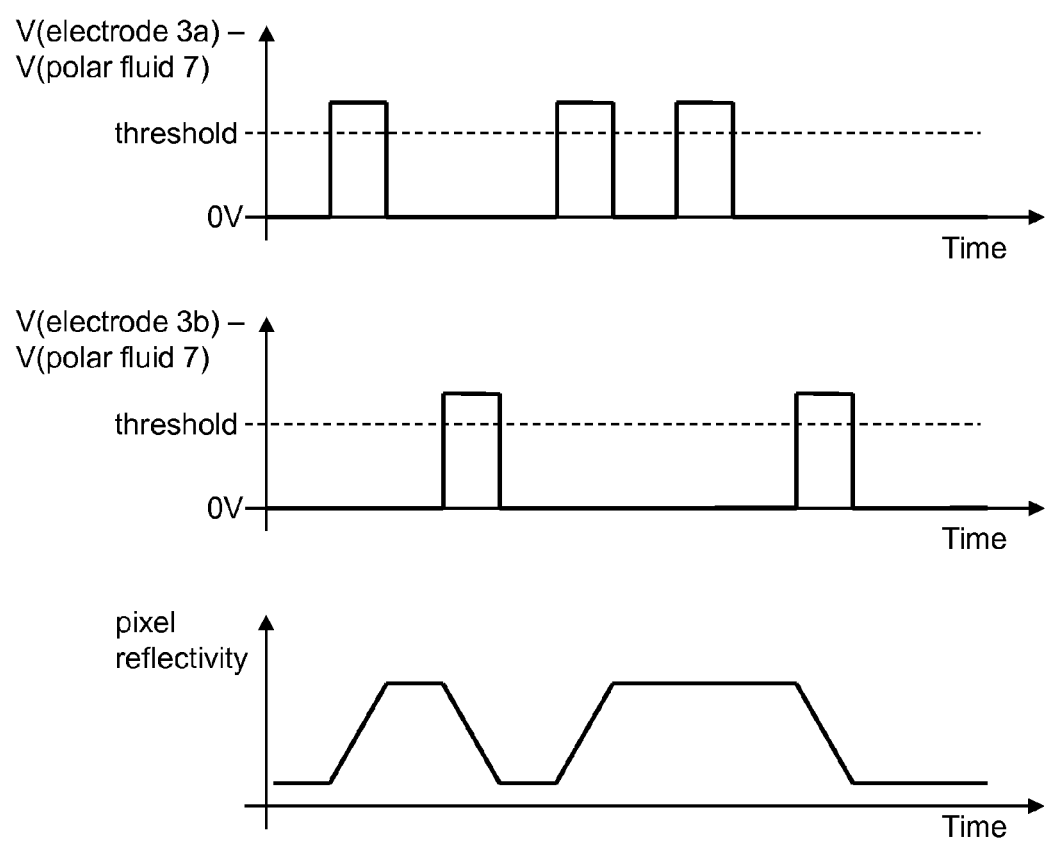
FIG. 3 Illustration showing an example of voltage pulses applied to upper and lower electrodes, and the resulting pixel reflectivity, as a function of time during the bistable mode of operation of the invention.

In order to switch between the two stable states of the system, therefore, voltage pulses are applied to either upper of lower electrode (3*a*) or (3*b*), whilst the other is connected to ground, in accordance with whichever of the two bistable states is required. Power is therefore only required during the voltage pulses, i.e. during a change in the displayed image, and not when a static image is being maintained, i.e. this constitutes a "low-power" mode of the display, which is efficient for low refresh rates. An example of an applied waveform for upper and lower electrodes (3*a*) and (3*b*) for "low-power" mode operation, together with the resulting pixel reflectivity is illustrated in FIG. 3.

In order to operate the pixel in the "video-rate" mode, the non-polar fluid (6) must initially be positioned on the upper-side of the multi-layer stack (8), as illustrated in FIG. 1(*a*). In other words, the display must first be completely "blanked" into the dark or black state. In order to do this, the upper electrode (3*a*) is connected to ground, and a potential difference is then applied between lower electrode (3*b*) and ground, as previously described. Once the pixel is thereby "blanked" into the first bistable state, addressing according to the "video-rate" mode can begin. This is done by applying a potential difference between upper electrode (3*a*) and ground, whilst maintaining a higher potential difference between lower electrode (3*b*) and ground. This will have the effect of increasing the wettability of the polar fluid (7) on the upper hydrophobic layer (5*a*), and therefore displacing the non-polar fluid (6) sideways so that it occupies or covers a smaller fraction of the area of the middle substrate (1*c*), as illustrated in FIG. 1(*c*). The non-polar fluid (7) will not move to the under-side of the multi-layer stack (8) because of the potential difference maintained between the lower electrode (3*b*) and ground, provided that that this potential difference is always larger than that between the upper electrode (3*a*) and ground. This is because in this case the wettability of the polar fluid on the lower hydrophobic layer (5*b*) will always be larger than that on the upper hydrophobic layer (5*a*), and hence the non-polar fluid (6) will remain on the upper-side of the multi-layer stack (8). FIG. 2(*c*) shows an example of an applied waveform for upper and lower electrodes (3*a*) and (3*b*) that would be used in order to first "blank" a pixel (i.e. move the non-polar fluid (6) into the first bistable position) and then move the non-polar fluid (6) sideways and hold it in a fixed droplet shape, setting the gray level of the pixel. FIG. 2(*c*) shows the non-polar fluid droplet (6) in a position close to the sidewall (2) of the pixel, furthest away from the channel (10). The droplet (6) can be in a random position on the upper-side of the multi-layer stack (8) for the video-rate mode. However, if required, the position of the droplet (6) can be reliably controlled to be as shown in FIG. 2(*c*) by coating the surface of pixel sidewall (2) furthest away from the channel (10) with a hydrophobic material such as Teflon or Cytop to increase wetting with the non-polar fluid (6).

Figure 4:
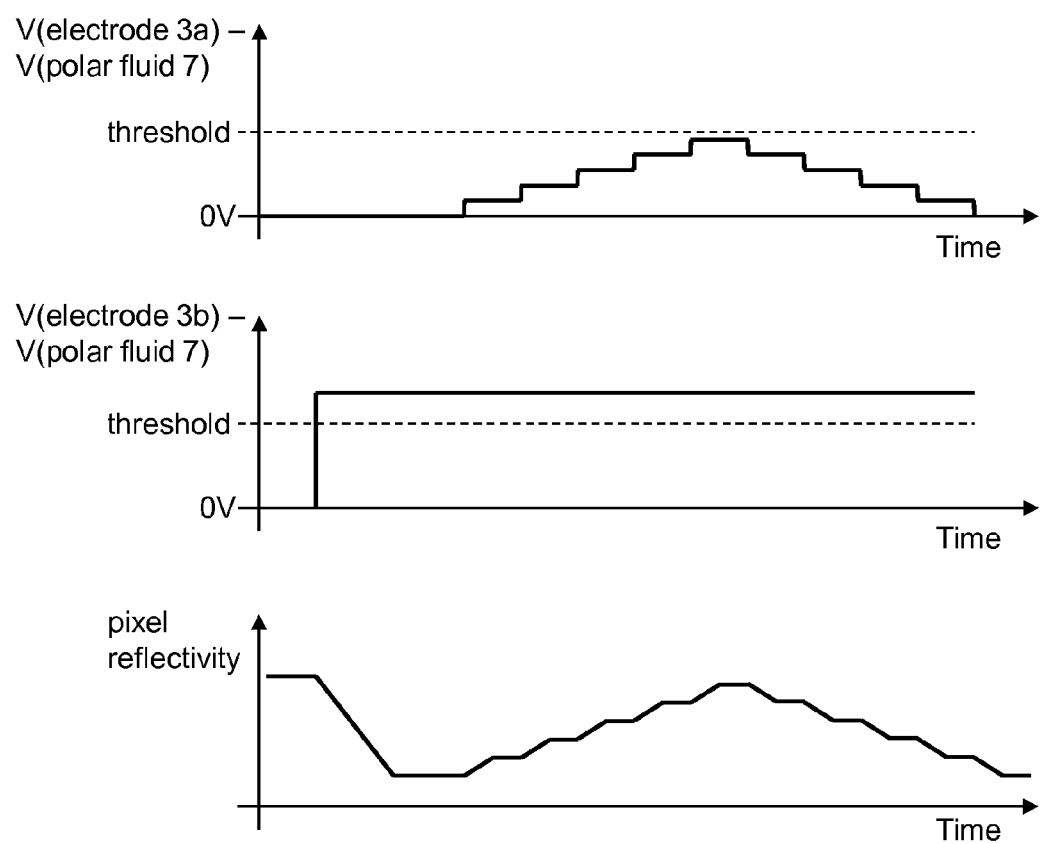
FIG. 4 Illustration showing an example of drive voltage applied to upper and lower electrodes, and the resulting pixel reflectivity, as a function of time during the video-rate mode of operation of the invention.

In contrast with the "low-power" mode of operation, in which a voltage pulse of sufficient magnitude and duration is required in order to cause bistable switching to occur, the "video-rate" mode of operation is an analogue mode, i.e. varying the potential difference between the upper electrode (3*a*) and ground while remaining below the predefined threshold associated with the second bistable state will vary the amount by which the non-polar fluid (6) is displaced, and therefore how much light is reflected back to the observer (9), in an analogue fashion. In the meantime, the potential difference between the lower electrode (3*b*) and the polar fluid (7) is maintained above the predefined threshold associated with the first stable state. An example of an applied waveform for upper and lower electrodes (3*a*) and (3*b*) for "video-rate" mode operation through a range of grey-levels, together with the resulting pixel reflectivity is illustrated in FIG. 4.

Figure 5:
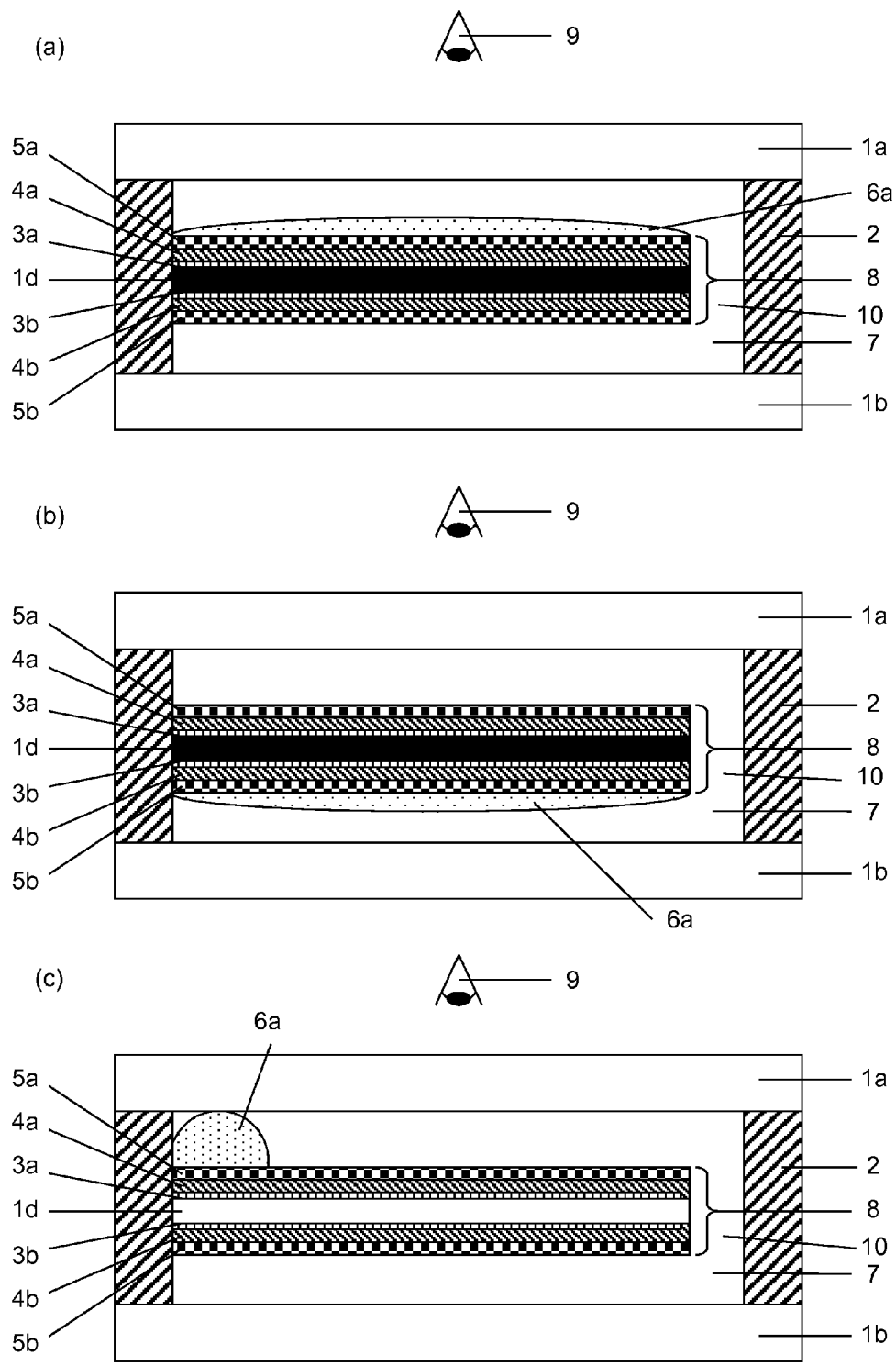
FIG. 5 Illustration showing typical electrowetting fluid distributions of a second configuration in the various modes of the present invention:
(a) a first bistable mode;
(b) a second bistable mode;and
(c) an example of fluid position in a video-rate mode.

In another embodiment, shown in FIG. 5, the configuration of the previous embodiment is modified so that a middle substrate (1*d*) is made of a black, absorbing material and non-polar fluid (6*a*) is a reflective fluid that acts as a reflector. FIG. 5(*a*) illustrates the first bistable state of the system, in which the non-polar fluid (6*a*) covers the top of the middle substrate (1*d*). Since the non-polar fluid (6*a*) is reflective, the pixel appears white to the observer. Equivalently, a second bistable state can be formed, in which the non-polar fluid (6*a*) is positioned underneath the middle substrate (1*d*), exposing the absorbing middle substrate (1*d*), i.e. showing a black pixel as illustrated in FIG. 5(*b*). Moreover, the "video-rate" mode of the pixel can be formed as shown in FIG. 5(*c*). The drive voltages applied to upper and lower electrodes to achieve first and second bistable state and "video-rate" state are identical to the illustration in FIG. 2.

Continuing to refer to FIG. 5, the middle substrate (1*d*) could be made from any material painted black, black anodized metal, or a nano-structured layer that is designed to absorb light, for example. The reflective non-polar fluid (6*a*) may be made by dissolving scattering or reflective particles such as metal particles or nanoparticles, or scattering dielectric particles such as titanium dioxide into a transparent oil such as dodecane, for example. Titanium dioxide particles, when smaller than the wavelength of visible light (e.g. ~200 nm) are very efficient scatterers of visible light, due to their high refractive index (2.5-3), and are commonly used as a pigment for white paints and plastics. It is possible to disperse titanium dioxide particles in an oil such as dodecane by using a dispersing agent such as Borchi Gen 911 from Borchers. The titanium dioxide particles remain dispersed in the dodecane for long periods of time, and do not disperse in the adjacent polar electrowetting fluid (7).

Figure 6:
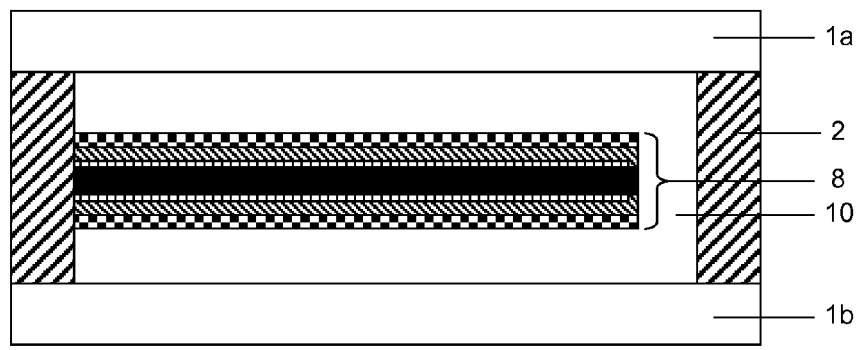
FIG. 6 Illustration showing alternative layouts of the multi-layer stack:
(a) Fluid channel at the edge;
(b) Fluid channel at the center;
(c) Fluid channel split up into several small channels;and
(d) Tapered multi-layer stack.
Figure 6:
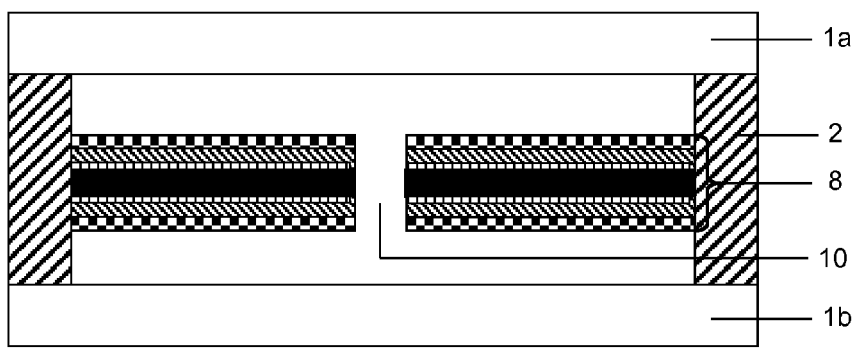
Figure 6:
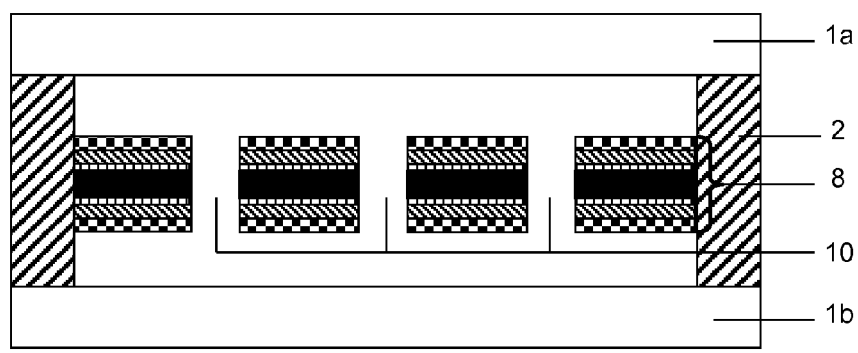
Figure 6:
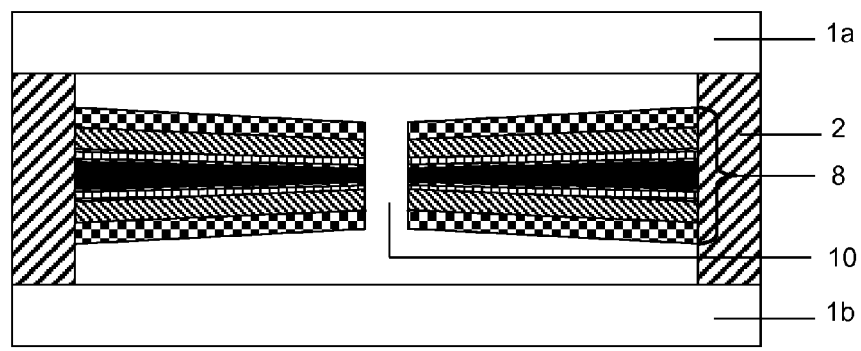

In yet another embodiment, the design of the multi-layer stack (8) is changed to modify fluid motion. FIG. 6 illustrates potential layouts, in which the channel (10), through which the fluid moves to reach on top or below the middle substrate, can be located in different positions anywhere from either edge of the electrowetting pixel (FIG. 6a) to the pixel center (FIG. 6b). The pixel can also be designed for the fluid to flow through several channels (FIG. 6c) as opposed to only one channel. In addition, the multi-layer stack can have a tapered cross section to assist fluid motion and increase switching speed.

Figure 7:
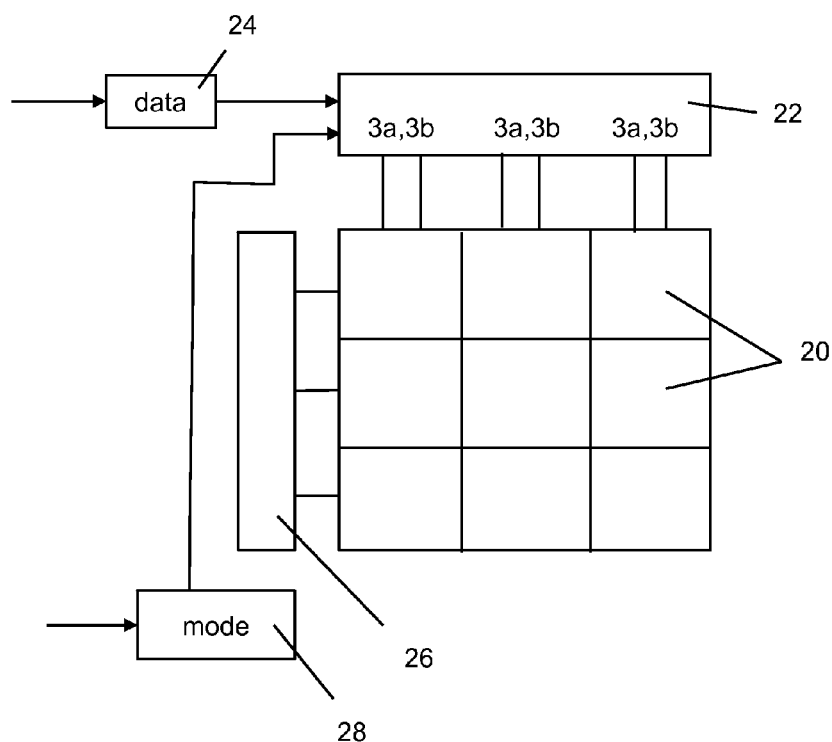
FIG. 7 Illustration showing a dual-mode electrowetting display device in accordance with an exemplary embodiment of the invention.

FIG. 7 is a simplified schematic of a dual-mode electrowetting display device according to the present invention. The display device is made up of an array of pixels (20). Each pixel (20) may be of the type described herein with respect to the embodiments of FIG. 1, 5 and 6, for example. The display device includes a driver circuit including a column driver (22) which supplies the appropriate voltages to the upper (3a) and lower (3b) electrodes to achieve the first stable state, second stable state, or video-rate mode as described above. Image data to be displayed is provided to the column driver (22) via a data interface (24). A row driver (26) determines the particular row of pixels (20) receiving the image data from the column driver (22) according to conventional active-matrix techniques. A mode selector (28) determines which particular mode the display device operates in based on a viewer input, for example.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The present invention is applicable to pixelated electrowetting displays, and is most usefully applicable to reflective displays. Although the invention could be applied to all sizes and types of displays, it is most appropriate in the case where dual mode functionality is useful, e.g. a portable device (necessitating overall low power consumption) requiring occasional video-rate use. Examples of such applications may be tablet PCs, mobile phones, PDAs and laptop computers.

The invention claimed is:

1. A dual-mode electrowetting display device, comprising:
a plurality of electrowetting pixels each configured to operate selectively in a bistable mode and a fast-switching analogue mode, wherein the display device includes:
a transparent upper substrate representing a face of the display device, and a lower substrate;
the electrowetting pixels each including a middle substrate which acts as a separator between two layers of electrowetting fluids, wherein one of which exists above the middle substrate and below the upper substrate and the other of which exists below the middle substrate and above the lower substrate, and at least one fluid channel which permits the electrowetting fluids to move between the layers, and wherein the middle substrate is configured to obscure the layer of electrowetting fluids which exists between the middle substrate and the lower substrate from an observer viewing the face of the display device; and
the display device further including a driver circuit configured to control an appearance of each pixel in the bistable mode and the fast-switching analogue mode by controlling positions of the electrowetting fluids within the two layers.

2. The display device according to claim 1, wherein the electrowetting fluids include a non-polar fluid which at least one of absorbs light and reflects light, and a transparent polar fluid.

3. The display device according to claim 2, wherein in a first bistable state of the electrowetting pixels in the bistable mode, the non-polar fluid covers the top of the middle substrate facing the upper substrate.

4. The display device according to claim 3, wherein in a second bistable state of the electrowetting pixels in the bistable mode, the non-polar fluid is positioned in the layer of electrowetting fluids between the middle substrate and the lower substrate so as to be obscured from the observer.

5. The display device according to any one of claim 2, wherein in the fast-switching analogue mode, the driver circuit is configured to control a fraction of the top of the middle substrate facing the upper substrate that is covered by the non-polar fluid in the electrowetting pixels.

6. The display device according to claim 2, wherein the middle substrate insofar as facing the upper substrate is at least partially reflective, and the non-polar fluid absorbs light.

7. The display device according to claim 2, wherein the middle substrate insofar as facing the upper substrate is light absorbing, and the non-polar fluid reflects light.

8. The display device according to claim 2, wherein the top of the middle substrate facing the upper substrate and the bottom of the middle substrate facing the lower substrate each include a respective electrode for controlling the wettability of the polar fluid thereat.

9. The display device according to claim 8, wherein the driver circuit is configured to drive the electrowetting pixels to a first bistable state in the bistable mode by providing a potential difference between the electrode at the bottom of the middle substrate and the polar fluid for at least a predetermined time and duration associated with the first bistable state while maintaining the electrode at the top of the middle substrate and the polar fluid at a same potential.

10. The display device according to claim 9, wherein the driver circuit is configured to drive the electrowetting pixels to a second bistable state in the bistable mode by providing a potential difference between the electrode at the top of the middle substrate and the polar fluid for at least a predetermined time and duration associated with the second bistable state while maintaining the electrode at the bottom of the middle substrate and the polar fluid at a same potential.

11. The display device according to claim 9, wherein the driver circuit is configured to drive the electrowetting pixels in the fast-switching analogue mode by varying the potential difference between electrode at the top of the middle substrate and the polar fluid while remaining below a predefined threshold associated with the second bistable state, and while the potential difference between the electrode at the bottom of the middle substrate and the polar fluid remains above a predefined threshold associated with the first bistable state.

12. The display device according to claim 11, wherein the driver circuit in driving the electrowetting pixels in the fast-switching analogue mode is configured to blank the electrowetting pixels by first driving the electrowetting pixels into the first bistable state.

13. The display device according to claim 1, wherein the at least one fluid channel is located at an edge of the electrowetting pixel.

14. The display device according to claim 1, wherein the at least one fluid channel is located at or between an edge and center of the electrowetting pixel.

15. The display device according to claim 1, wherein the electrowetting pixels each include a plurality of fluid channels.

16. The display device according to claim 1, wherein the middle substrate in each electrowetting pixel has a tapered cross section to assist fluid motion and increase switching speed.

17. The display device according to claim 1, wherein the middle substrate includes hydrophobic layers on the top of the middle substrate facing the upper substrate and the bottom of the middle substrate facing the lower substrate.

* * * * *